United States Patent [19]

Möder

[11] 3,906,452

[45] Sept. 16, 1975

[54] METHOD FOR CONNECTING AND DISCONNECTING SYSTEM UNITS IN A MODULARLY CONSTRUCTED DATA PROCESSING SYSTEM

[75] Inventor: Hans-Ulrich Möder, Munich, Germany

[73] Assignee: Siemens Aktiengesellschaft, Berlin & Munich, Germany

[22] Filed: Apr. 3, 1972

[21] Appl. No.: 240,465

[30] Foreign Application Priority Data

Apr. 7, 1971 Germany ........................... 2117128

[52] U.S. Cl. ............................................. 340/172.5

[51] Int. Cl.² .......................................... G06F 13/00

[58] Field of Search .................................. 340/172.5

[56] References Cited

UNITED STATES PATENTS

| | | | |
|---|---|---|---|
| 3,200,380 | 8/1965 | MacDonald et al. | 340/172.5 |
| 3,274,561 | 9/1966 | Hallman et al. | 340/172.5 |
| 3,411,139 | 11/1968 | Lynch et al. | 340/172.5 |
| 3,419,852 | 12/1968 | Marx et al. | 340/172.5 |
| 3,505,648 | 4/1970 | McGovern et al. | 340/172.5 |
| 3,566,363 | 2/1971 | Driscoll, Jr. | 340/172.5 |
| 3,641,505 | 2/1972 | Artz et al. | 340/172.5 |
| 3,671,942 | 6/1972 | Knollman et al. | 340/172.5 |
| 3,680,052 | 7/1972 | Arulpragasam et al. | 340/172.5 |
| 3,689,897 | 9/1972 | Sciuchetti | 340/172.5 |
| 3,716,843 | 2/1973 | Schmitt et al. | 340/172.5 |

*Primary Examiner*—Gareth D. Shaw
*Assistant Examiner*—John P. Vandenburg

[57] ABSTRACT

A method is described for establishing and disconnecting connections between the various system units of a modularly-constructed program controlled data processing system. The system units may be any one of the various processing units, such as line connection units, or storage units. Those system units which are processing units communicate cyclically with each other over the system units which are central storage units. This communication takes place in such a manner that the cycle allocation occurs over a central control unit or computer on the basis of cycle demands emananting from a system unit. In order to establish or disengage connections between individual system units for both directions of operation, two signals are transmitted in each case. That is, for each direction of operation one signal is formed as a static signal, and the other signal is formed as a dynamic signal. When the central storage units are in a ready-for-service condition, they make available a static signal. In order to establish the connection only those system units which are processing units and are demanding a connection with a storage unit thereafter transmit a static signal and a dynamic signal. The latter static and dynamic signals are evaluated in the storage units concerned, and are acknowledged by the return of the dynamic signal. Only when this condition has occurred are the cycle demands from the system units desiring connection operated on. For this disengagement of a connection the static signal issuing from the system unit desiring the disengagement is disconnected.

5 Claims, 3 Drawing Figures

METHOD FOR CONNECTING AND DISCONNECTING SYSTEM UNITS IN A MODULARLY CONSTRUCTED DATA PROCESSING SYSTEM

BACKGROUND OF THE INVENTION

The invention relates to a method for establishing and removing connections between system units of a modularly constructed program-controlled data processing system. The system units, which are available as processing units, communicate cyclically with one another over the system units available as central storage units, whereby the operating cycle allocation is executed on the basis of the cycle requests emanating from a system unit.

In recent years, a program-controlled data processing system has become known which is utilized with particular advantage as a program-controlled switching system. Such systems find application in telecommunication exchange installations. In such a processing system, a number of system units are available as processing units, wherein program-controlled processing operations can be performed. All data and programs for the operation of the processing system are contained in a central storage unit which, in turn, can likewise be considered as a system unit.

At all times, the processing units communicate with each other over the central storage unit. This takes place in a manner such that a processing unit, wherein an operation shall be executed, demands storage cycles from the storage unit in accordance with the functions to be performed by it, through which data is then exchanged with the central storage. Both the demand and the allocation of storage cycles take place over a central control in the storage from which the cycle requests, for example, in accordance with the priorities of the tasks to be performed, are allocated to the requiring processing units.

To increase the reliability and dependability of such a processing system, it is known in the art to provide for individual multiplex system units. This construction, known as a modular construction, offers the possibility, due to the interchangeability of individual system units, of having the function of a system unit performed by the other units in case of a breakdown. The multiplex arrangement, e.g., a duplicating of system units, extends to the system units available as processing units, as well as to those available as storage units.

The principle of this processing system, described in greater detail in U.S. Pat. No. 3,711,835, is shown in FIG. 1. The system units VE1 to VE6, are in each case available for performing specific tasks, that is to say, they are processing units. Thus, in the example shown, system units VE1 and VE2 serve as line connection units, to which selective trunk circuits and secondary distribution circuits can be connected. An example of a line connection unit of this type is described in detail in U.S. Pat. No. 3,717,723. Each of the system units VE3 and VE4 represent a program control unit, which serves to coordinate the tasks to be executed in the system. An example of a program control unit of the foregoing type is described in detail in U.S. Pat. No. 3,660,824. Other system units serves to operate the system, that is, to handle the input of commands required for the operation and serves to establish the connection of external units. System units of this type are well known in the telecommunication arts. In the bottom part of the figure is disposed the system unit available as a central storage unit.

The modular construction of the system is shown by the fact that both the line connection unit and the program control unit are duplicated; therefore, there are two processing units VE1 and VE2 and VE3 and VE4, respectively. No doubling is provided in the example for signaling control unit VE5 and calling unit VE6. On the other hand, the storage units are available in duplicate.

Each of the storage units identified by SP1 and SP2 contains a core storage KS, a storage operation controls SOPS, a storage-request control SAFS and a program-request control PAFS. As part of the storage-request control a monitoring circuit UWS, having access to all the elements of a storage unit, is provided. The individual system units available as processing units are connected via control lines to the storage-request controls and program-request controls of both storage units. To carry the data traffic, i.e., to handle the input and output of information, they have access to core storages KS via an information line. The central storage unit including the storage request control SAFS, the program request control PAFS and the supervision circuit UWS are described in detail in U.S. Pat. No. 3,711,835. An example of the storage operation control SOPS is described in detail in commonly assigned, allowed U.S. application Ser. No. 233,662. These elements are identified by like reference letters in these references.

A processing unit desiring data traffic with the storage unit directs a cycle request to the control units SAFS, PAFS in the storage unit via one of the control lines. There, the cycle request is recognized and rated. The cycle allocation takes place by taking into account various factors, e.g., the priority of the operations to be executed in the requiring processing units through cooperation of the storage-request control, the program-request control and the storage-operating control. Details describing the cycle allocation and the control of the aforesaid units can, for example, be found in the foregoing U.S. Pat. No. 3,711,835. With the allocation of a storage cycle, which is communicated to the requiring processing unit by supplying a signal, a direct information path to the core storage is available thereto.

It has already been pointed out that the processing system is modularly constructed, that is, the individual system units are available a number of times, e.g., in duplicate, to increase the reliability of the entire system. It has proved to be of advantage to construct the system units in a manner such that they can be interchangeable with defective units. However, with respect to the operation of the total system, this construction results in a series of problems. For example, a defectively operating system unit must be disconnected from the system and the system must be connected, without interruption, to the system unit taking over its function. After the defective system unit has been repaired, it must be connected to the total system, again without interruption. If a system unit, which is a storage unit, is involved, there is the further problem that the unserviceable system unit must be brought back to its prior condition within a short time.

SUMMARY OF THE INVENTION

The aforementioned and other objects are achieved

:cording to this invention by a novel means for estab-ihing and disabling connections between system units ' a modularly constructed program-controlled pro-:ssing system of the type described hereinabove. To .tablish and to disable connections between individual stem units for both directions of transmission, two gnals are transmitted in each case, of which, for each rection, one is formed as a static signal and the other ; a dynamic signal. Each of the system units operating ; central storage units makes available, in the ready-ır-service condition, a static signal, and the system nits desiring a connection with a storage unit transmit static as well as a dynamic signal, which static signal rated in the storage units and acknowledged by the :turn of a dynamic signal. Not until this stage has been :ached are the control signals, e.g., cycle demands, nanating from the system units concerned, taken into .nsideration.

To disable a connection, the static signal emanating om the system unit desiring the disablement is vitched off. By transmitting two signals in each case nd in each direction, one succeeds in not automati-ally reconnecting an unserviceable, i.e., defectively perating, system unit which signals its operating trou-le only briefly, and subsequently, spuriously, signals new a readiness for service. Whereas the operation to stablish a connection is only executed in the system nits available as processing units by transmitting, in ie ready-for-service condition of the storage unit, both static and a dynamic signal, the operation to disable connection is performed in the system units available s processing units, as well as in those available as stor-ge units.

Because in accordance with the invention, the pro-essing unit desiring a connection supplies the two sig-.als, i.e., the static as well as the dynamic signal, to ooth storage units to establish the connection, the es-ablishment of identical connections from the process-ng units to both storage units and, thus, the synchro-ious running of the two storage units, is at all times as-ured.

The breakdown of a system unit operating as a stor-ıge unit generally results in loss of information to this torage unit. Thus, it is necessary to bring a discon-iected storage unit to its pre-existing condition prior to :onnecting it to the total system. That is, the storage ınit must be supplied with the information that has eached the other storage unit taking over the opera-ion during the breakdown.

According to a further development of the invention, t is proposed that an additional static signal, hereinaf-er called reclosing signal, be transmitted to reconnect ı disconnected storage unit, which signal reaches all )rocessing units from the storage unit to be recon-iected. During the availability of the static reclosing .ignal a reconnecting condition is established. In the )rocessing units, this reclosing signal, together with the .tatic signal indicating the readiness for operation of a .torage unit, is rated such that the establishment of :onnections to the storage unit to be reconnected is :oncurrently initiated in all processing units.

According to a further development of the invention, luring the reconnecting condition, the processing ınits, for the acceptance of data and programs, at all :ime communicate solely with the storage unit con-iected during the breakdown. To execute operations :hat change the contents of storages, they must also communicate with the storage unit heretofore discon-nected. The reset of the first step is that programs and data for operating the system are not taken from the storage unit to be reconnected until it has been brought to its pre-existing condition. The second step results in that concurrently with the exchanging, by which the in-formation from the storage unit heretofore connected alone is accepted into the second storage unit, also all changes brought about by the flow of other programs at this juncture are taken into account.

A further advantage of the method in accordance with the invention is that to each system unit, regard-less of whether it is simplex or multiplex, an indepen-dent control means can be allocated, over which the formation and transmission of the aforesaid signals can be initiated manually or by automatic control. Such a control means, which can be constructed as a control panel for manual operation, can further have optical and/or acoustic indicator switching means, which indi-cate the respective conditions of the individual system units. Since such a control panel, in addition to the con-trol system unit centrally available to the entire system, is available to each system unit available for the execu-tion of similar tasks, it is now possible to separately exe-cute the establishment of connections, disablement of connections and reconnecting system units for each system unit without interfering with the operation of the other system units.

BRIEF DESCRIPTION OF THE DRAWINGS

The principles of the invention will be most readily understood by reference to a description, given herein-below, of a preferred form of apparatus for carrying out the method of the invention and to the drawings in which.

DETAILED DESCRIPTION OF THE DRAWINGS

Figure 2:
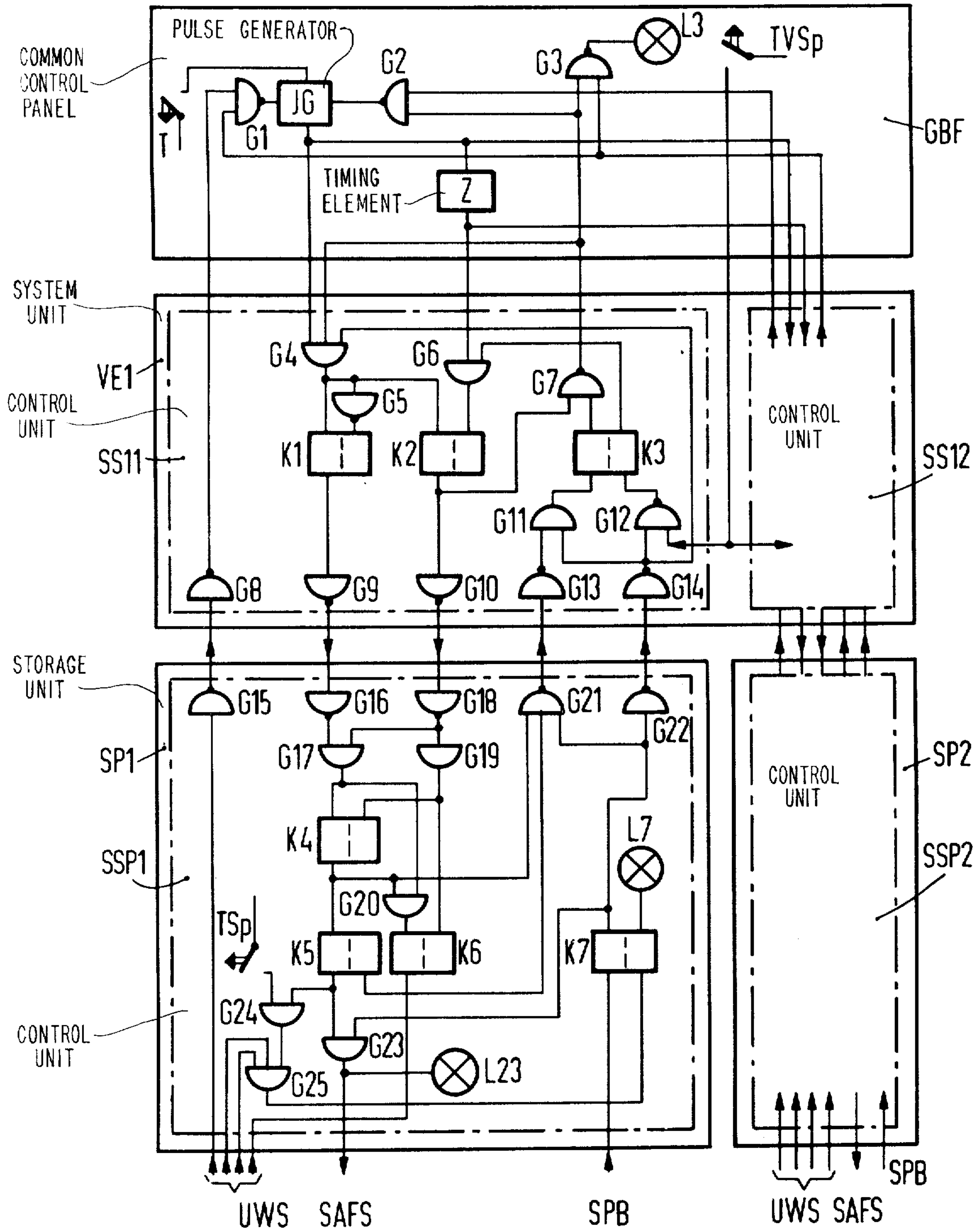
FIG. 2 is a block-schematic diagram of pertinent por-tions of the FIG. 1 system constructed to perform the method, the portions shown illustrate establishment and disconnection of connections between processing units

Of the processing unit identified as VE1 and the stor-age units designated as SP1 and SP2, in FIG. 2, only the control unit SS11 in processing unit VE1 and SSP1 in storage unit SP1, is illustrated in detail. Control units SS12 and SSP2 are identically constructed.

Figure 1:
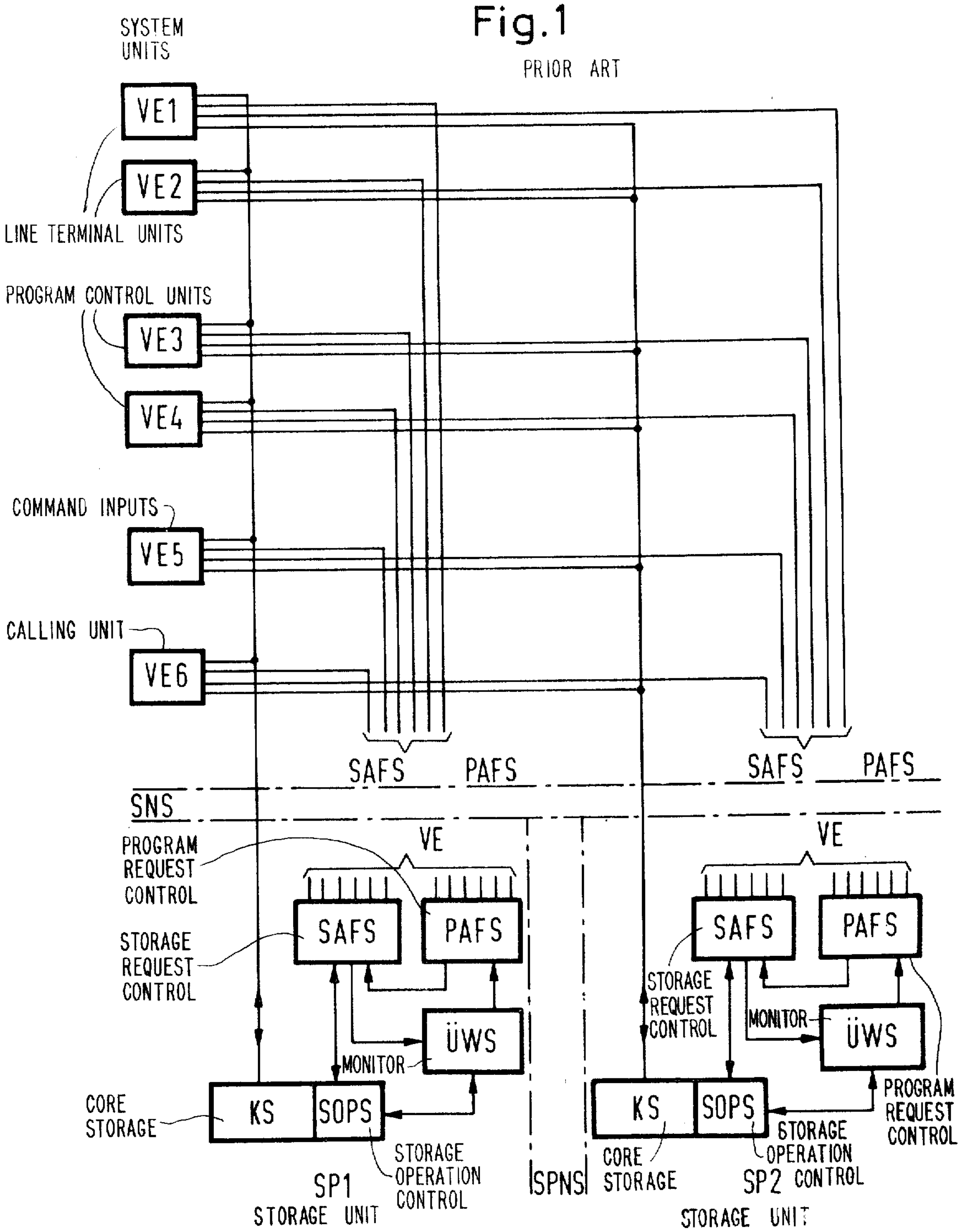
FIG. 1 is a block diagram of a known program con-trolled telecommunication exchange system.

Common control panel GBF is allocated as the con-trol means for control units SS11 and SS12 of process-ing unit VE1. The aforesaid processing units have ac-cess to the redundantly available storage units SP1 and SP2 via system standard interface SNS. Both the out-puts and inputs of the storage units are connected via control lines to monitoring circuits UWS and to stor-age-request controls SAFS described in FIG. 1. For clearer identification of the channels running via the system standard interface, only the signal lines are shown which are required for connecting, disconnect-ing and reconnecting system units. All other control and data lines have been omitted.

The control unit in the system units for disconnecting and reconnecting connections is made up of gates and clock-actuated switching stages. Details of the construction are indicated in the description of the mode of operation below.

In the rest position of the circuit which, for example, is set when the power supply is cut in, all switching stages are in 0-position, i.e., in each case the left output of a switching stage supplies a "0" and the right output a "1." Since each system unit has its own power supply, it is possible that not all system units assume this rest position at the same time.

For purposes of description it is assumed that switching stages K1 to K3 in control unit SS11 of processing unit VE1, as well as switching stages K4 to K7 in control unit SSp1 of storage unit SP1, assume the connected state.

If a storage unit is ready for service, a signal SPB (storage ready) is sent to circuit SSP1 within the central storage unit and is formed by the central part of the storage unit in a conventional manner not described herein, this signal controls the switching stage K7. This stage is a bistable circuit, which after being reversed, transmits the static signal BA (ready for service — outgoing) via gate G22. This static signal BA, which is transmitted via a line of the system standard interface SNS, is available to processing unit VE1 and is supplied to an output of gate G4 in control unit SS11 via gate G14. In this regard, the establishment of a connection which, as explained hereinabove, emanates from the processing units, which are in a switched on condition. This condition can be initiated by actuating push button T in control panel GBF. However, the invention is not restricted to the establishment of a connection by manual initiation. On the contrary, automatic initiation is also possible, for example, by monitoring the arrival of the static signal BA.

A pulse generator IG is activated via push button T in the illustrated embodiment. This pulse generator IG generates an output pulse from the time $m$ to time $m+1$ at the output of gate G4, constructed as an AND gate. Bistable switching stages K1 and K2, in processing unit VE1, thus prepared, are switched to the 1-position with the system timing pulse at the moment $m+1$. Since the second input of switching stage K2, in the course of the duration of the pulse trains generated by the pulse generator IG, is held in the 0-position, a static signal, i.e., signal BE (ready for service — incoming) is available. This second input to K2 is received over gate G6 and a timing element, which is held in a zero state during the pulse trains. Switching stage K1, on the other hand, is reversed with the system timing pulse $m+2$, so that a dynamic signal, i.e., dynamic signal VH (establish connection) is transmitted.

Both signals VH and BE, which are transmitted to the respective inputs of the control unit SSP1 in storage unit SP1 via the system standard interface SNS, are supplied to switching stage K4 via gates G16 and G17 (signal VH) and G18 and G19 (signal BE). Sweep stage K4 is prepared by incoming signal VH at the moment $m+1$ and switched with the reversal of the signal VH during the next system timing pulse at the moment $m+2$. Switching stage K5 is prepared via the output of stage K4 at the moment $m+2$ and reversed with the following system timing pulse at the moment $m+3$. A seizure signal is available via the output of stage K5 and AND gate G23; the second of gate 23 having been pulsed with a 1 signal via the output of bistable stage K7. This signal can be rendered visible by lamp L23, for example. At this same time, a message is transmitted concerning the seizure to storage request control SAFS.

By logically interconnecting the signals generated at the outputs of switching stages K4 and K5 with the signal indicating the readiness for operation of the storage, the dynamic signal VP is generated via gate G21, and this signal reaches control unit SS11 of processing unit VE1 over system standard interface SNS. The signal is evaluated in SS11 to acknowledge the desire for a connection. To achieve this, switching stage K3 can be controlled by interconnecting the signal VB with the static signal BA. Switching stage K3 is prepared with the arrival of the signal AB at the moment $m+2$. The change from the 0-state to the 1-state takes place with the next system timing pulse at the moment $m+3$. By connecting the timing element Z, which may be a conventional counter and which up to the moment $m+3$ sets a logical 0 at the first input of AND gate G6, the disconnection of the static signal BE transmitted via the output of stage K2 is always assured. However, for this condition to be fulfilled, from $m$ to $m+3$, the dynamic signal VE must not have arrived, since in that case stage K3 is not reversed and, after the period has lapsed, stage K2 automatically reassumes the output state. If the dynamic signal VB has arrived within this period, the connection between processing unit VE1 and storage unit SP1 has been established. Thus, it is possible to monitor the signal (VE) which acknowledges the connection demand (signal VH).

As a rule, the establishment of a connection described hereinabove occurs concurrently in both storage units, whereby in each of the two storage units the same operations take place. However, there is a peculiarity, if only one storage unit is ready for service. If the other storage unit is connected during this condition, the storage unit to be connected transmits, in addition to the static signal BA, by which its readiness for service is indicated, the reclosing signal WS, which reaches pulse generator IG via gates G8, G1 or G2 and causes the transmission of a pulse therein. Thus, the operations described hereinabove are initiated, terminating in the establishment of a connection to this storage unit, as well.

By switching in gates G1 and G2, an interlocking of the reclosing signals WS emanating from both storage units is possible, so that the establishment of seizures by the processing units, during the reclosing condition of a storage unit, identical to those in the other storage unit, is assured.

It has been pointed out hereinabove that the activity for the establishment of a connection always originates in the processing units, while the disconnection thereof can originate in the processing units, as well as in the storage units. Where the disablement of a connection originates in the processing unit VE1, the switching stage K3 therein is manually set in the 0-state via push button TVS$p$ or through automatic control of the system, e.g., by a disabling signal which can emanate from a monitoring circuit and which is supplied to both the control units SS11 and SS12 of the processing unit VE1. Thus, stage K2, too, is set in the 0-state via the output thereof and through AND gate G6, which leads to the disconnection of the signal BE. As a result, in the control unit of the storage unit in question, switching :ages K4 and K5 are reset, but independently there-·om, switching stage K7 remains in the 1-position, i.e., ıe signal BA, which characterizes the ready-for-ɜrvice condition of the storage unit, is again available. 'hus, the establishment of a connection can be initi-ted in the manner described hereinabove, starting ·om a processing unit.

Where the disconnection of a connection originates ı the storage unit, the bistable stage K7 is reset in the -state via the disabling signals emanating from moni-ɔring circuits UWS and gate G25, so that the signal ₗA, which characterizes the ready-for-service condi-ıon of the storage unit, is disconnected. This operation an be initiated manually, for example via push button 'S1, or it can, for example, be signalled optically by neans of a lamp L7, so that in the control unit of the ırocessing unit VE1 so that the stage K3 is reset in the ı-state via gates G14 and G12 and then, via gate G6, he switching stage K2 is reset, as well. Thus, the signal 3E emanating from the control unit of the processing ınit VE1 is disconnected which, again, causes the re-etting of stages K4 and K5 in the control unit of the torage unit. In this condition, a connection to the stor-ıge unit can no longer be established. This is again pos-ible, when the signal for the readiness for service of he storage unit, i.e., the signal BA, is again transmit-ed.

The switching stage K6 in the control unit of the stor-ıge unit SP1 serves to monitor the signal VW which :manates from the control unit of a processing unit and nitiates a seizure. Since it is assumed that the signal √H is transmitted as a dynamic signal, it is recognized ıs defective, if it arrives as a constant signal. In this :ase, bistable stage K6 is switched to the 1-state. This ;ignal is retransmitted via the output of this stage, is guided to the monitoring circuits UWS, and the con-ıection is again disabled in the manner described here-.nabove. It is also possible to monitor in the same man-ıer the dynamic signal VB in the control units of the processing units.

The operation of the disengagement of a connection discussed hereinabove also takes place, when a pro-cessing unit establishes a call to one storage unit only. Since both storage units must always be operated syn-chronously, so that they can be utilized as interchange-able units, it is necessary that a connection, when both storage units are ready for operation, be identically es-tablished to both units. To recognize such an erroneous seizure, the seizure conditions of the storage units are constantly compared. The establishment of a seizure of the storage units which does not meet the required con-ditions immediately leads to the initiation of the opera-tions disabling the connection. The disconnection itself then occurs so rapidly that in the meantime no storage cycle yet has been able to develop, so that the synchro-nous running of both storage units is not disturbed, and the information in both storage units remains identical.

It has been pointed out hereinabove that in a modu-larly built system, in the course of operation, a system unit can break down and the activity thereof is then taken over by the other system unit. This is of consider-able importance when one of the storage units fails.

Figure 3:
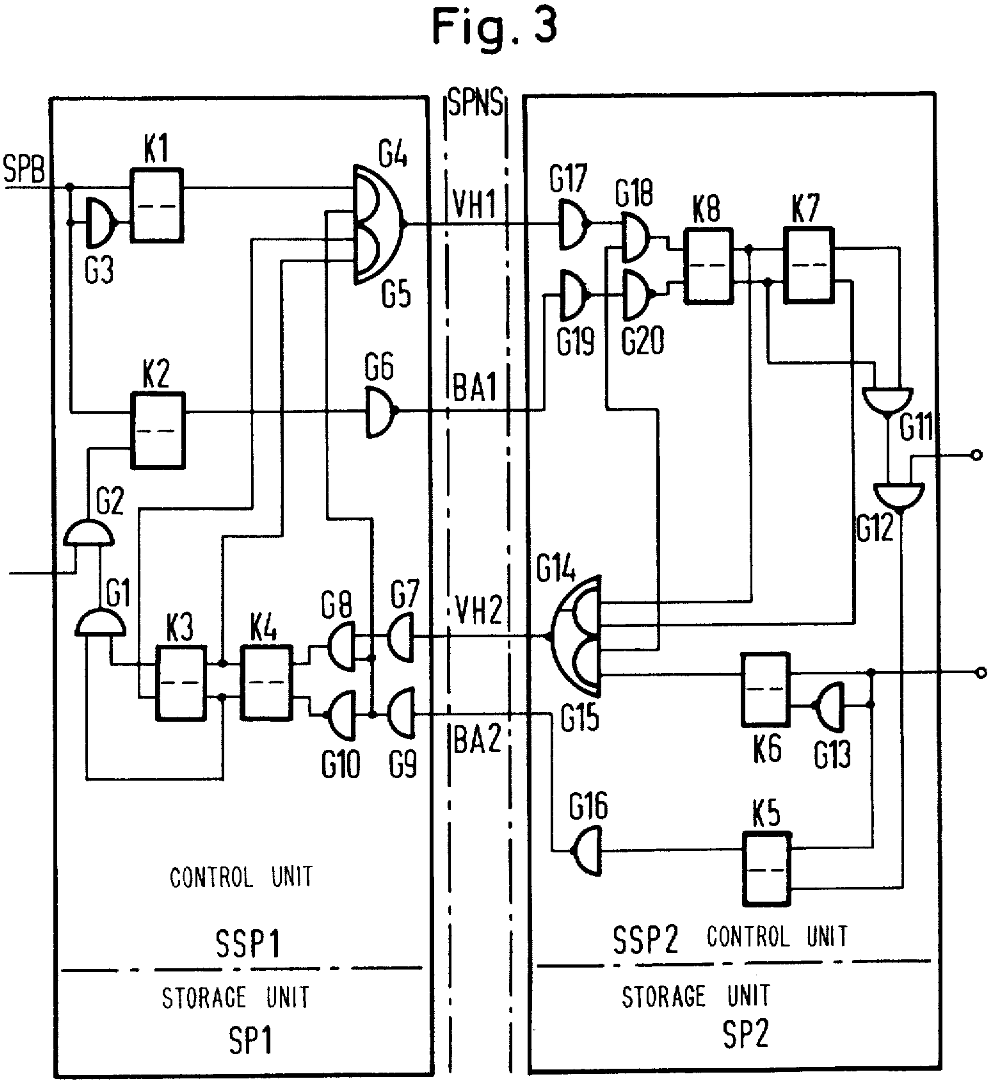
FIG. 3 is a block-schematic diagram of pertinent por-tions of the FIG. 1 system illustrating the establishment and disconnection of connections between storage units.

The operation of the disengagement and the estab-lishment of connections between two storage units will be best understood from the following detailed descrip-tion taken in conjunction with the drawing of an em-bodiment in FIG. 3. On the left-hand side of the figure is shown a control unit SSP1 of the first storage unit SP1, and on the right-hand side a control unit SSP2 of the second storage unit SP2. Both are identically con-structed with respect to their units for producing and evaluating signals which disable or establish a connec-tion. The storage units are interconnected via an inter-face SPNS. The connectors to the system standard in-terface, over which the connections lead to the individ-ual processing units, have been omitted for a clearer description. The transmission of signals again in this case occurs through dynamic and static signals.

For the description of the mode of operation, let it be assumed that the storage unit SP1 on the left is switched in first, for example, by actuating the power supply. By this means, the individual switching stages K1 to K4 in the control unit SSP1 are set in a predeter-mined position. Let it further be assumed that the latter is characterized by the fact that the upper halves of the bistable switching stages are in the 0-position. With the arrival of the signal SPB, which signals the readiness for service of the storage, both switching stages K1 and K2 are prepared for the switching and are switched to the 1-position with the next system timing pulse. As a result of the disabling action of gate G4, only signal BA1 is available via gate G6, which reaches the control unit SSP2 of the second storage unit SP2 and signals thereto the readiness for operation of the first storage unit. This condition remains stable until the second storage unit SP2 is ready for operation.

If sweep stages K5 to K8 in control unit SSP2 of the second storage unit SP2 have likewise been set in the predetermined position discussed hereinabove by switching on the power supply, and if the signal SPB (ready for storage), which characterizes the readiness for operation of the storage unit, is also available therein, then here, too, the switching stages K5 to K6 are prepared and switched with the next system timing pulse, e.g., at the moment *tn*. Through gate G16, the signal BA2, which characterizes the readiness for ser-vice of the second storage unit via interface SPNS, reaches the control unit in the storage unit SP1, but when the ready-for-storage signal SPB comes in, switching stage K6 in the control unit of storage unit SP2 is switched. By this means, via gate G15, because of the signal BA1 coming in via gate G19, signal VH2 is transmitted via interface SPNS to first storage unit SP1. Thus, in control unit SSP1, bistable stage K4 is switched to the 1-position via gates G7 and G8 with the next system timing pulse at the time *tn*+1, and stage K3 is correspondingly prepared and likewise switched to the 1-position with the next system timing pulse at the moment *tn*+2.

During the period between the operations of stages K4 and K5, signal VH1 is transmitted via gate G5 at the moment *tn*+1, transmitted via interface SPNS, and uti-lized in control unit SSP2 of the second storage unit via gates G17 and G18 for the preparation of stage K8. The latter is switched to the 1-state with the next system timing pulse *tn*+2, thus preparing sweep stage K7, which likewise reaches the 1-position with the next sys-tem timing pulse *tn*+3. Via gate G14, over which a pulse is transmitted during the period between the op-erations of stages K8 and K7, a signal VH2 was trans-ferred. However, since, as is assumed, storage unit SP1 was the active unit for the establishment of the connec-tion, this signal remains without effect in the control unit of storage unit SP1, as stage K4 is already in the 1-state. Hence, the condition which is set as a result of the operations described hereinabove characterizes an establishment of connection between the two storage units.

Like the establishment of a connection, the disablement of a connection can originate in both storage units. For this disconnection operation, a signal VS which, e.g., comes from the central monitor, is evaluated. If, for example, this signal comes into the control unit of storage unit SP1, bistable stage K2 is set in the 0-state with a system timing pulse $m$ via gate G2. Over gate G6, this signal reaches, via interface SDNS and gates G19 and G20, the stage K8 in the control unit of the other storage unit which, in turn, switches to the 0-state with the next system timing pulse $m+1$. The latter operation prepares the following bistable switching stage K7, so that the latter is also switched to the 0-state with the next system timing pulse $m+3$. Over gates G11 and G12, a pulse is available during the time between the changes in state of the stages K7 and K8, and this pulse switches stage K5 in the control unit of the second storage unit SP2 to the 0-state. Since the signal BA2, which emanates from the second storage unit, is thus changed, stage K4 in the control unit of the first storage unit is prepared such that it, too, is switched to the 0-state with the next system timing pulse $m+3$. The latter step prepares stage K3 via the output thereof for switching to the 0-state with the fourth system timing pulse $m+4$.

The storage unit which has not produced a disconnection thereafter resets the bistable switching stage in the control unit through the action of the ready-for-storage signal which is still available therein, and over this path the signal characterizing the readiness for service of this storage unit, i.e., the signal BA, is available. Thus, the establishment of the undisturbed storage unit as the first switched-in storage unit is now assured. The establishment of the connection can then be initiated immediately thereafter in the manner described hereinabove. The connection can be made, if the interference in the storage unit, which has previously caused the disconnection, has in the meantime been removed.

The monitoring of the signals VH, as shown in the embodiment illustrated in FIG. 2, can be made dependent on whether the incoming signals are actually formed as dynamic signals.

The method of the invention in accordance with the principles of the invention for establishing and disengaging connections, as well as for reconnecting switched-off storage units, has the advantage of providing for independent operational units for the control of units available as interchangeable system units. Thus, there is a possibility of connecting, disconnecting and reconnecting individual system units manually or automatically, whereby, in each case the conditions required by the system, such as, for example, clock synchronism, prevention of loss of information, etc., are observed. Moreover, the invention offers the advantage that all working conditions can at any time be rendered visible by simple optical means. The arrangement of signal indications is illustrated in FIG. 2 as an example.

It will be noted that the preferred embodiment of the invention is described herein, in part, in the form of an arrangement of known telecommunication components. As pointed out hereinabove, these components, not described in detail, are known in the art and will be recognized by their identification. Accordingly, a detailed structural description of these components is not given herein.

Although certain preferred embodiments of the invention have been disclosed for purposes of illustration, it will be evident that various changes and modifications may be made therein without departing from the scope and spirit of the invention, as defined by the appended claims.

I claim:

1. In a program controlled data processing system of modular construction, which system contains processing units and central storage units, said processing units and said central storage units communicating in a cylical manner, a method for switching on and switching off connections between processing units and central storage units, comprising the steps of:

- initiating a switching on condition for establishing a connection between at least a said processing unit and a said central storage unit,
- generating and transmitting from a said central storage unit a static signal only if that central storage unit is in a ready for service condition,
- evaluating said transmitted static signal in said processing units which are in a switched on condition,
- generating and transmitting from said processing units in a switched on condition, responsive to said evaluating step, a static and dynamic signal to said central storage units,
- evaluating said static and dynamic signals in said central storage units and transmitting, responsive thereto, a dynamic signal to said processing units enabling the switching on of connections and
- evaluating the static signals initiating the switching off condition by determining the absence of said static signals in said processing units and said central storage units and, responsive thereto, causing the disconnection of existing connections.

2. The method defined in claim 1 wherein said static and dynamic signals issuing from said processing units which are in a switched on condition are transmitted concurrently to all of said storage units which are in the ready for service condition and are transmitting said static signal to the processing units.

3. The method defined in claim 2 comprising the further steps of:

- monitoring the establishment of a connection between said processing units and said storage units by constantly comparing the state of seizures of said storage units, and
- disengaging a connection upon a determination that the connection is established only with one of said storage units prior to the return of said acknowledging signal.

4. The method defined in claim 1 wherein an additional static signal is used to reconnect a storage unit which has been disconnected from the system because of a defect or the like, comprising the further steps of:

- transmitting said additional static signal to said processing units from said disconnected storage unit,
- producing signals from the one of said storage units connected to replace said storage units to be reconnected, said signals indicating the correlation between the existing connections from the processing units to both of said storage units and
- establishing a reconnection condition during the existence of said additional static signal.

5. The method defined in claim 4 wherein during said reconnecting condition, said processing units communicate with said replacing storage unit for accepting data and programs and wherein said processing units communicate with said storage unit to be reconnected for changing storage contents.

* * * * *